US011687723B2

(12) United States Patent
Nagesh et al.

(10) Patent No.: US 11,687,723 B2
(45) Date of Patent: Jun. 27, 2023

(54) NATURAL LANGUAGE PROCESSING WITH MISSING TOKENS IN A CORPUS

(71) Applicant: INTERNATIONAL BUSINESS MACHINES CORPORATION, Armonk, NY (US)

(72) Inventors: Raj Nagesh, Cary, NC (US); Charles Christopher Walker, Cary, NC (US); Kriteshwar Kaur Kohli, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 16/826,846

(22) Filed: Mar. 23, 2020

(65) Prior Publication Data

US 2021/0294979 A1    Sep. 23, 2021

(51) Int. Cl.
| | |
|---|---|
| *G06F 40/30* | (2020.01) |
| *G06F 40/284* | (2020.01) |
| *G06N 5/04* | (2023.01) |
| *G06N 20/00* | (2019.01) |

(52) U.S. Cl.
CPC ............ *G06F 40/30* (2020.01); *G06F 40/284* (2020.01); *G06N 5/04* (2013.01); *G06N 20/00* (2019.01)

(58) Field of Classification Search
CPC ........ G06N 20/00; G06N 5/04; G06F 40/284; G06F 40/30
See application file for complete search history.

(56) References Cited

U.S. PATENT DOCUMENTS

| | | | |
|---|---|---|---|
| 6,173,251 B1 | 1/2001 | Ito | |
| 9,990,687 B1* | 6/2018 | Kaufhold | ........... H04N 1/32267 |
| 10,816,981 B2* | 10/2020 | Hazard | ................ G05D 1/0246 |
| 2003/0028566 A1 | 2/2003 | Nakano | |
| 2015/0254230 A1* | 9/2015 | Papadopoullos | ... G06F 16/3331 707/739 |
| 2016/0140425 A1* | 5/2016 | Kulkarni | ............. G06F 18/2411 382/159 |
| 2016/0307566 A1* | 10/2016 | Bellegarda | ........... G06N 3/0454 |
| 2017/0132203 A1* | 5/2017 | Kim | ....................... G06F 40/279 |
| 2018/0165554 A1* | 6/2018 | Zhang | ................. G06F 18/2411 |
| 2018/0261118 A1* | 9/2018 | Morris | ..................... G09B 7/02 |
| 2019/0065589 A1* | 2/2019 | Wen | ...................... G06F 16/353 |
| 2019/0095788 A1* | 3/2019 | Yazdani | ................. G06N 3/045 |
| 2019/0294695 A1* | 9/2019 | Stoyanovsky | .......... G06F 16/36 |
| 2020/0117531 A1* | 4/2020 | Sudharsana | ............ G06N 20/00 |

(Continued)

OTHER PUBLICATIONS

Accenture, "Solutions.AI for Processing," Accenture.com, [accessed Dec. 26, 2022], 25 pgs., Retrieved from the Internet: <https://www.accenture.com/be-en/services/applied-intelligence/solutions-ai-processing>.

*Primary Examiner* — Neeraj Sharma
(74) *Attorney, Agent, or Firm* — Anthony R. Curro

(57) ABSTRACT

Text blocks are semantically compared, and a semantic score is provided to a user. The semantic score is based on application of a machine learning model trained on a text corpus. One or both of the two text blocks may have one or more words that do not appear in the training text corpus (skip-words). Skip-words are used, rather than discarded, to adjust the semantic score via, for example, a penalization function. The user provides feedback about the accuracy of the adjusted semantic score, and the feedback is used to perform supervised learning model.

19 Claims, 3 Drawing Sheets

(56) References Cited

U.S. PATENT DOCUMENTS

| | | | |
|---|---|---|---|
| 2020/0175360 A1* | 6/2020 | Conti | G06N 3/04 |
| 2020/0176121 A1* | 6/2020 | Dalal | G06N 3/006 |
| 2020/0265196 A1* | 8/2020 | Ravi | G06F 40/44 |
| 2021/0142126 A1* | 5/2021 | Warrick, II | G06F 18/2411 |
| 2021/0157983 A1* | 5/2021 | Kalluri | G06F 40/216 |

* cited by examiner

NATURAL LANGUAGE PROCESSING WITH MISSING TOKENS IN A CORPUS

BACKGROUND

This invention relates generally to computerized natural language processing (NLP), and particularly to processing involving missing tokens in an NLP corpus.

Natural language processing (NLP) is a branch of artificial intelligence in computer science. One NLP function is to train and use machine learning (ML) models that can be used in textual analysis. For example, the trained models can be used to determine whether and to what extent two texts or documents are similar to one another.

Two examples of machine models are word embedding and bag-of-word models.

Word embedding is an NLP technique that uses a machine learning model, such as a neural network, to map tokens (words or phrases) from an input vocabulary to a vector of real numbers. For example, sentences stored in a text corpus may processed using, a word embedding technique, to generate a set of semantic vectors; for example, one semantic vector for each processed token.

Bag-of-words is another NLP technique in which a text is represented as a multiset (a "bag") of its constituent words.

Embodiments of the present invention provide solutions to problems and limitations in the prior art that the inventors have uniquely discovered and appreciated.

SUMMARY

Embodiments of the invention provide for methods, computer program products, and systems for determining semantic similarity between two text blocks using a machine learning model.

According to an embodiment of the invention, the method receives two text blocks (a first text block and a second text block) for comparison to one another. The semantic comparison is performed using a machine learning model that is trained on a text corpus (a training corpus). The method identifies an unobserved token in at least one of the two text blocks, wherein the unobserved token does not appear in the text corpus used to train the machine learning model. The unobserved token is undetected, unknown, or missing from the text corpus. The token is also known as a skip-word. The method determines a semantic similarity between the two text blocks based on the unobserved token.

According to an embodiment, the machine learning model includes a word embedding model or a bag-of-words model. Other models used for semantic comparison of text or text analysis/classification may be used. These models may be generated and used in embodiments of the invention.

According to an embodiment, the method determines a cosine similarity score based on determining a semantic similarity between the two text blocks using the machine learning model. In an embodiment, this occurs before determining a semantic similarity based on the unobserved word. The method then penalizes the cosine similarity score based on the unobserved token; the method's determination of a semantic similarity between the two text blocks, based on the unobserved token, is based on the penalizing. The penalizing function takes into account the influence of skip-words on the semantic analysis or comparison of the two text blocks, instead of skipping or discarding the skip-words.

According to an embodiment, penalizing the cosine similarity score is based on a skip error ratio term and the cosine similarity score. According to an embodiment, the skip error ratio term is based on the number of skipped or unobserved tokens in the first text block relative to the total number of tokens in the text block; and the number of skipped or unobserved tokens in the second text block relative to the total number of tokens in the second text block.

According to an embodiment, penalizing the cosine similarity score is based on a skip error ratio term, the cosine similarity score, and an overlap term. According to an embodiment, the overlap term modifies the penalizing function based on which unobserved or missing tokens overlap (i.e., they appear in both the first and second text blocks).

According to an embodiment, the method adjusts the semantic similarity based on user feedback. The user is presented with the semantic similarity (for example, using a score), and is prompted to provide feedback as to its accuracy. For example, the semantic similarity can be expressed using a semantic similarity score. The score is adjusted or recalculated based on user feedback.

According to an embodiment, the machine learning model is trained using an unsupervised training process. The machine learning model can be retrained via a supervised training model using the user feedback.

According to an embodiment, the method determines a new semantic similarity between the two text blocks based on the penalizing. For example, a semantic similarity score is calculated based on application of the machine learning model and then adjusted based on the penalizing function that takes unobserved or skip-words into consideration.

According to an embodiment, the semantic similarity is based on a semantic similarity score.

According to embodiment, a computer system is provided for performing the above methods.

According to an embodiment, a computer program product is provided for performing the above methods.

DETAILED DESCRIPTION

Figure 1:
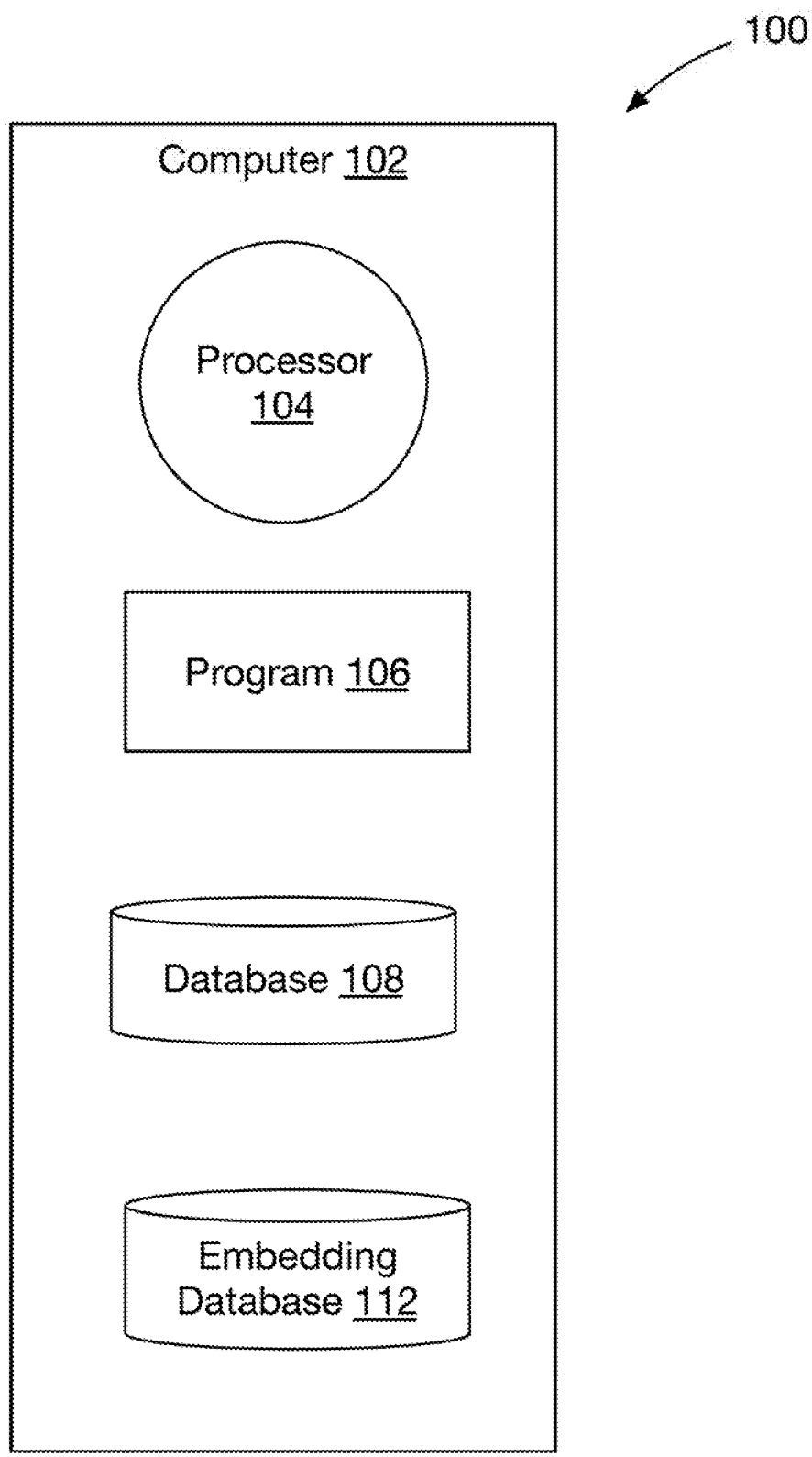
FIG. 1 is a functional block diagram of a computing environment 100 according to an embodiment of the invention.

According to an embodiment of the invention, in some NLP applications, word embedding models refer to unsupervised shallow neural networks that operate on input tokens to generate semantic vectors. The quality of the word embedding models depends on the quality of the training dataset (also referred to as "training corpus") used to train them. Although embodiments of the invention are described in connection with word embedding models, persons of ordinary skill in the art will appreciate that they are applicable to other NLP applications and models, without departing from the spirit or scope of the claimed invention.

For instance, consider that during a training phase of generating an embedding model, there will almost certainly be tokens (words or phrases) that are missing from (or are "unobserved" or "unrecognized" in) the training corpus. Thereafter, when the trained embedding model is used to process new input text (so as to generate semantic vectors for the new input text), the trained embedding model may receive missing or unobserved tokens as input.

In the prior art, the missing or unobserved tokens of the new input text are discarded, and no net information is gathered using them. In other words, not only do the missing or unobserved tokens not contribute to the semantic vector, these words are not used to retrain the embedding models. One reason for this approach in the prior art is that using the missing words to improve the embedding model is costly; for example, depending on the size of the data sets, it can take hours or days to retrain the embedding model, as it typically requires reprocessing all training data including the newly observed words.

At least some embodiments of the present invention solve this problem by updating and optimizing word embedding models and similarity scores derived from previously missing or unobserved tokens in a given corpus.

Prior art solutions are inadequate in addressing this problem. For example, some solutions require retraining the full embedding model under consideration using the newly observed tokens; this is costly (it can take hours or days to perform this process depending on the dataset and n-gram level used to retrain the full embedding model). Some solutions use a nearest neighbor search with cosine similarity to find another token believed to be similar to the newly observed token, but this sacrifices accuracy (this process often yields false results and does not consider semantic similarity). In the prior art, there is no known process for penalizing the cosine similarity based on missing or unobserved tokens, and there is no feedback mechanism to improve the word embedding model.

To address these and other limitations of the prior art, embodiments of the invention provide methods, systems, and computer program products to update and optimize a word embedding model (among other types of models) and similarity scores generated using the model based on processing of previously missing or unobserved tokens.

According to an embodiment of the invention, a cost function is defined to optimize the similarity score generated by using an embedding model that includes the influence or impact of the previously missing or unobserved token.

According to an embodiment of the invention, the similarity score is optimized and modified based on receiving user feedback. This feedback process allows for increased domain-specific accuracy, and extends a word embedding model to new and/or updated text corpora.

Some embodiments of the invention will be discussed in connection to an illustrative example (EXAMPLE 1). Consider a data scientist who engages with a method, system, or computer program product that practices an embodiment of the invention. The data scientist works on a project and builds an embedding model (or another model, such as a bag-of-words model) by training the model on a known corpus of data (i.e., the dataset is available to the data scientist). During development of a solution that uses the embedding model, there is a change to the corpus (for example, new data is discovered, generated, acquired, or otherwise becomes available for use). Under the prior art, the data scientist would have to choose between several bad options to use the new dataset: spend hours or days of valuable project time to retrain the embedding model(s); use the new dataset but sacrifice accuracy using nearest neighbor cosine similarity; or do nothing and lose the benefit of the new dataset.

Continuing with EXAMPLE 1, the data scientist may choose instead to use embodiments of the invention to take advantage of the newly observed tokens in the new dataset.

Embodiments of the invention are advantageous over the prior art for at least the following reasons. Currently, over 80% of enterprise data is unstructured, and therefore, is likely to contain missing or previously unobserved tokens. Additionally, NLP is used across industries to leverage insights from this unstructured data (again, as new industries and domains are explored, there will be previously missing or unobserved tokens). Additionally, word embedding models are used in a variety of document similarity or classification tasks, including, for example, enterprise data, banking and retail data, human resource data, supply chain data, and legal data (in each case, "data" includes documents), to name a few.

Embodiments of the invention will now be described in greater detail in connection with the Figures.

FIG. 1 is a functional block diagram of a computing environment 100 according to an embodiment of the invention. In FIG. 1, computing environment 100 includes computer 102, whose general structure and components may be those described in connection with FIG. 3, below.

Computer 102 includes a processor 104, a program 106, a database 108 (storing a known text corpus or a newly available text corpus), embedding database 112 (storing embedding models in one embodiment; this database may store other model types as well).

Processor 104 generally processes programming instructions of program 106 to perform one or more methods. Program 106 operates on data stored (or to be stored) on database 108 and embedding database 112; each database stores one or more records. Program 106 and the databases are stored on a tangible storage medium of computer 102. It shall be apparent to a person of ordinary skill in the art that although one computer, one processor, one program (and some databases) are depicted in FIG. 1, these components can be distributed among more than one computing device, and may be provided via cloud computing or other distributed computing models, without diverging from the spirit or scope of the claimed invention.

More particularly, program 106 performs word embedding functions (or other model generation functions) as described in connection with the various Figures, among others.

Database 108 generally includes data on which various NLP tasks of interest are to be performed or data produced by practicing embodiments of the invention; such as blocks of text, a text corpus of training data, user feedback, semantic scores, and other data.

Records stored in embedding database 112 generally are embedding models (or other models) that are generated using training data processed via an unsupervised machine learning process (or another training process). They may include a trained neural network. They additionally may include semantic vectors generated for input text processed using the trained neural network.

Figure 2:
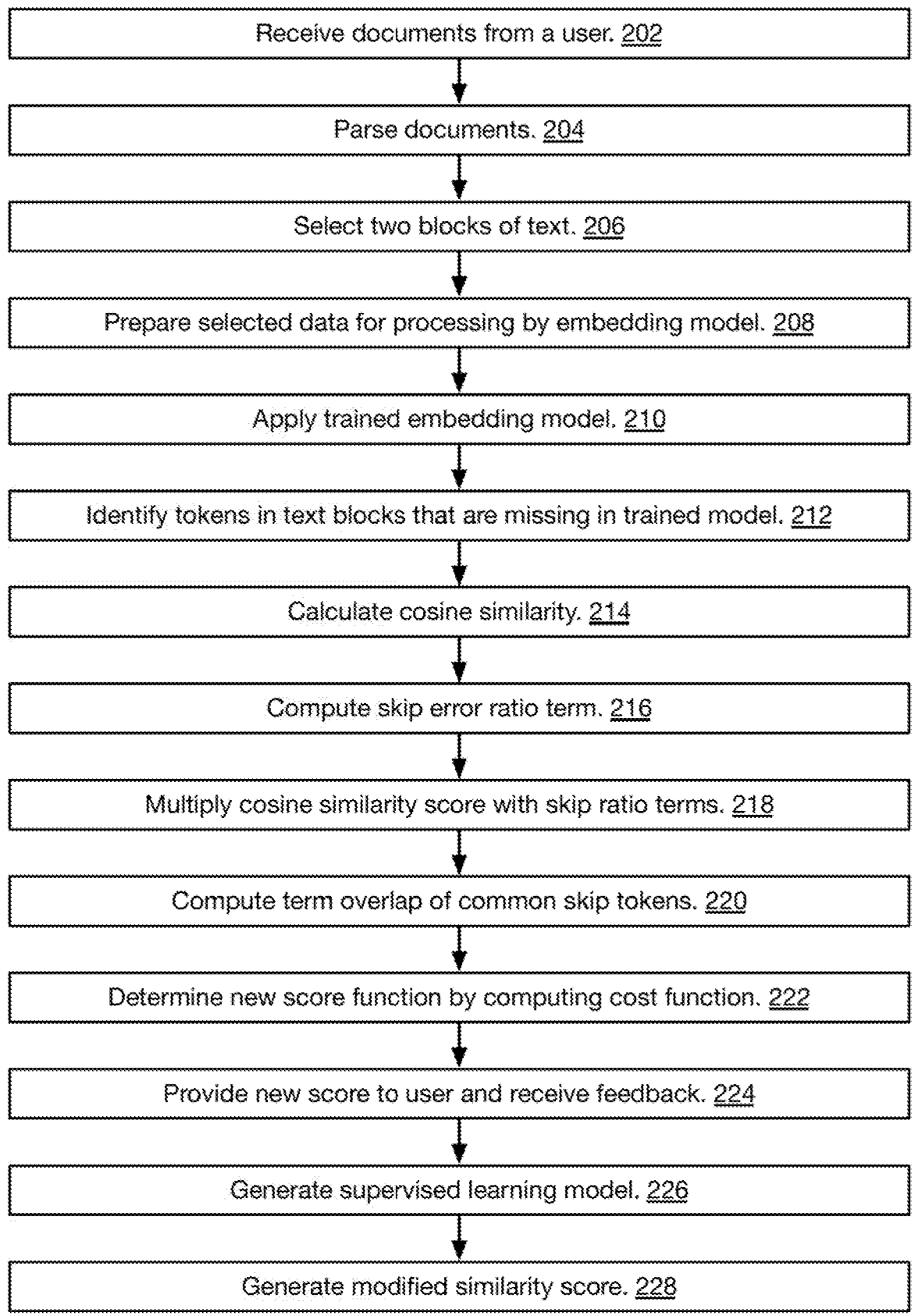
FIG. 2 is a functional flow diagram of steps of a method 200, according to an embodiment of the invention.

FIG. 2 is a functional flow diagram of steps of a method 200, according to an embodiment of the invention.

Program 106 receives (step 202) documents from a user for semantic comparison. The documents may be received from the user in response to presenting the user with a document upload interface in a browser application.

Program 106 parses (step 204) the documents received (step 202) from the user. The parsing includes, in one embodiment, parsing the documents into logical blocks of text according to a set of predefined or dynamically determined parsing rules. In one embodiment, the parsing may be applied to all content of the received (step 202) documents; in another embodiment, the parsing may be performed on a curated set of text from each of the received documents. The choice of which approach to use may be determined based on predefined rules, user settings or selections, or dynamically determined rules.

Program 106 selects (step 206) two blocks of text, for example, Text_A and Text_B, to be compared. The selection (step 206) may be performed for every block of text from a first document relative to every block of text from another document; or may be performed for subsets of these documents based on filtered sets of parsed (step 204) blocks. A block of text refers to a stream, fragment, or set of characters, of text.

Program 106 prepares (step 208) the selected (step 206) data for processing by an embedding model (or another model). In an embodiment, preparing (step 208) the selected (step 206) data includes cleaning, preprocessing, and tokenizing the data based on the needs or specifications of processing the data using a trained embedding model.

Program 106 begins applying (step 210) a trained embedding model (for example, a word2vec model trained on an existing text corpus). During application (step 210), or thereafter if desired, program 106 identifies (step 212) tokens in Text_A and Text_B that are missing or unobserved in the trained embedding model. For example, program 106 determines that one or more such words do not appear in the vocabulary of the existing text corpus.

Program 106 calculates (step 214) a cosine similarity score between Text_A and Text_B using the existing embedding model.

Program 106 computes (step 216) a skip error ratio term based on the number of tokens skipped from the existing embedding model's vocabulary for Text_A and Text_B.

Program 106 multiplies (step 218) the cosine similarity score with the skip ratio terms for Text_A and Text_B.

Program 106 computes (step 220) a term overlap of common skipped tokens from Text_A and Text_B.

Program 106 determines (step 222) a new score by computing a cost function from skip ratio terms and skip overlap terms with the original cosine similarity score.

Program 106 provides (step 224) the new score to a user via, for example, a graphical user interface, and presents the user with an option to provide feedback on the new score (for example, via a thumbs up, thumbs down, or other indications of the user's feedback on the accuracy of the new score).

Program 106 generates (step 226) a supervised learning model to predict a modified score, based on the user feedback.

Program 106 generates (step 228) a modified similarity score based on processing Text_A and Text_B using the generated (step 226) supervised learning model.

With continued reference to FIG. 2, aspects of the above steps will now be described in greater detail as Phases 1-4. During a functional phase (Phase 1), program 106 may compute a cosine similarity score using an existing word2vec embedding model. In this process, program 106 trains a custom word2vec model on the newly available domain corpus after performing NLP data pre-processing and cleaning tasks on the corpus. This model is used for computing semantic or cosine similarity between two texts.

A user can login to the system implementing an embodiment of the invention to upload documents which need comparison (either in their entirety, or for parts thereof).

Program 106 parses the documents and generates logical blocks of text extracted from them, for comparison.

The two blocks of text, Text_A and Text_B, are tokenized using, for example, NLTK in Python. The tokens are passed through the word2vec model to identify: a) those tokens that are skipped from the model vocabulary in Text_A; and b) the tokens that are skipped from the model vocabulary in Text_B.

Program 106 computes a cosine similarity score between the two blocks of texts—Text_A and Text_B using the custom word2vec model we built with keyword tokens that are in the model vocabulary from both the texts. This outputted Cosine Similarity Score may be called "S1".

Note that both Text_A and Text_B are processed through NLP pre-processing steps at this point; such as removal of stopwords, punctuations, single character tokens, etc., before being passed through the cosine similarity function.

During a second functional phase (Phase 2), program 106 may penalize the original score for skipped tokens from the existing model vocabulary, as follows:

Program 106 computes a skip error ratio term for the ratio of words skipped from model vocab in each text:

$$\text{skip\_}A = [1-(\text{no. of skipped tokens in Text\_}A/\text{total no. of tokens in Text\_}A)] \quad \text{a)}$$

$$\text{skip\_}B = [1-(\text{no. of skipped tokens in Text\_}B/\text{total no. of tokens in Text\_}B)] \quad \text{b)}$$

Program 106 multiplies the cosine similarity score S1 computed in Phase 1 with the skip error ratio terms skip_A and skip_B calculated in Phase 2. This operation penalizes the original score for the number of words that were skipped from the model vocab in the two blocks of texts. Let us call this product S_Prime, as follows:

$$S\_Prime = S1*\text{skip\_}A*\text{skip\_}B$$

During a third functional phase (Phase 3), program 106 adds a term for overlap of skipped tokens between Text_A and Text_B, as follows.

Although program 106 considers the tokens skipped from the model vocabulary for penalizing the similarity score, it may be desirable not penalize it for the overlapping skip words from the two text blocks A and B. Another term can be used to inflate the penalized score a bit to take into consideration the overlapped skipped words. This additional term can be called "INT", where:

$$\text{INT} = \text{count}(\text{intersection of skipped tokens from Text } A \text{ and Text } B)/\text{Square Root }[\text{no.}(\text{skip\_}A)*\text{no.}(\text{skip\_}B)]$$

$$\text{INT} = \frac{\text{len}(\text{skip\_A} \cap \text{skip\_B})}{\sqrt{\text{len}(\text{skip\_A})*\text{len}(\text{skip\_B})}}$$

A constant value "α" can be used, which is between 0 and 1 with the term that inflates the penalized score "S_Prime" calculated in Phase 2 for the overlapped skip words from the model vocabulary between both the texts. Note that if there is no overlap between the two sets of skipped words, the new score would be S_Prime that was calculated before.

$$\text{New\_Score} = S\_Prime + [\alpha(1-S\_Prime)]*\text{INT}$$

The New_Score Equation with the full notation of Cost Function after combining expressions from Phase 1, 2 and 3, is as follows:

$$\text{New\_Score} + \text{Cosine\_Sim}(A, B)*\text{skip\_A}*\text{skip\_B} + [a(1-\text{Cosine\_Sim}(A, B)*\text{skip\_A}*\text{skip\_B})]*$$

$$\left\{ \frac{\text{len(skip\_A} \cap \text{skip\_B)}}{\sqrt{\text{len(skip\_A)} * \text{len(skip\_B)}}} \right\}$$

During a fourth functional phase (Phase 4), program 106 uses user feedback to modify score if the user finds it not accurate enough.

In this process, the New_Score calculated that was calculated in the previous Phase, after penalizing the original cosine similarity score for skipped words and inflating a bit using a term for the overlapped skip words, is more standardized and regularized in comparison to an overfit original score that is achieved from the cosine similarity.

The user can now check the accuracy of the new semantic similarity score after applying our cost function. The user can provide his/her feedback on the system, which captures and stores it and based on user's feedback, and another supervised learning model is run to predict a modified user-acceptable score.

The user feedback mechanism that the system captures can be a positive or negative feedback of the new computed score. For example, the feedback mechanism can be in the form of two buttons, such as a thumbs up (for accepting our new computed score) and a thumbs down (if the user feels the score is not accurate enough). The system may use '0' for thumbs down and '1' for thumbs up and a NULL or −1 in case the user does not provide any feedback.

The system can re-compute and predict the modified score using an underlying supervised learning model. The model is trained on an initial set of set of records with features like word embeddings of tokens from Text_A and Text_B, calculated similarity score and user feedback to predict the new modified target score.

Figure 3:
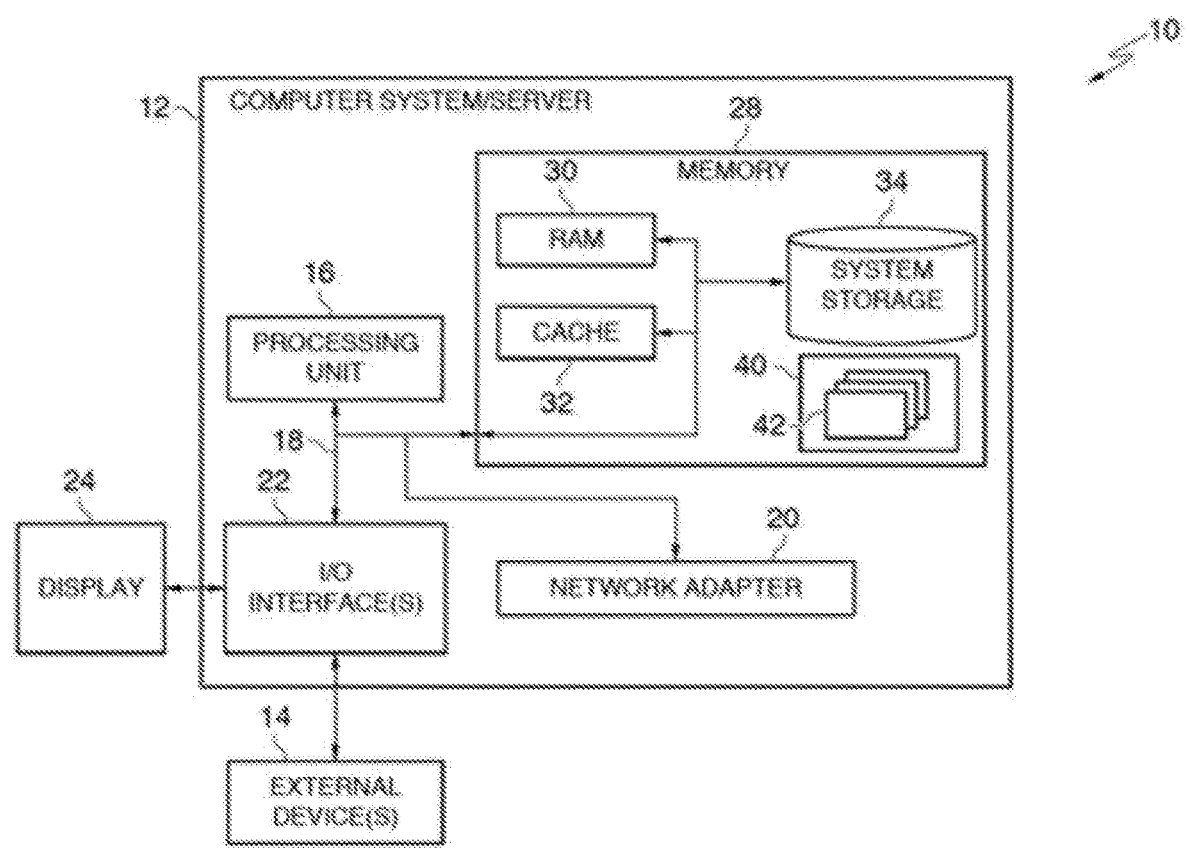
FIG. 3 is a functional block diagram of an illustrative computing device, according to an embodiment of the invention.

FIG. 3 is a block diagram of an illustrative computing node, according to an embodiment of the invention. Computing node 10 is only one example of a suitable cloud computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining semantic similarity between two text blocks using an unsupervised machine learning model, comprising:

accessing by a computer processor a text corpus, the text corpus stored in a database;
training a neural network machine learning model with the accessed text corpus using an unsupervised learning process, the unsupervised learning process not requiring user feedback to train the neural network machine learning model;
receiving two text blocks for comparison, the comparison performed using the trained unsupervised machine learning model;
identifying an unobserved token in at least one of the two text blocks, wherein the unobserved token does not appear in the text corpus used to train the unsupervised machine learning model; and
determining a semantic similarity between the two text blocks based on the unobserved token that does not appear in the text corpus used to train the machine learning model, the semantic similarity and the unobserved token used to retrain the machine learning model to improve accuracy.

2. The method of claim 1, wherein the unsupervised machine learning model comprises a word embedding model or a bag-of-words model.

3. The method of claim 1, further comprising:
determining a cosine similarity score based on determining the semantic similarity between the two text blocks using the unsupervised machine learning model; and
penalizing the cosine similarity score based on the unobserved token,
wherein determining the semantic similarity between the two text blocks based on the unobserved token is based on the penalizing.

4. The method of claim 3, wherein penalizing the cosine similarity score is based on a skip error ratio term and the cosine similarity score.

5. The method of claim 3, wherein penalizing the cosine similarity score is based on a skip error ratio term, the cosine similarity score, and an overlap term.

6. The method of claim 1, further comprising:
adjusting the semantic similarity based on user feedback.

7. The method of claim 5, further comprising:
determining a new semantic similarity between the two text blocks based on the penalizing.

8. The method of claim 1, wherein the semantic similarity is based on a semantic similarity score.

9. A computer program product for determining semantic similarity between two text blocks using an unsupervised machine learning model, the computer program product comprising programming instructions embodied on one or more tangible storage media, the programming instructions being executable by one or more processors to perform a method, the programming instructions comprising instructions for:
accessing by one or more processors a text corpus, the text corpus stored in a database;
training a neural network machine learning model with the accessed text corpus using an unsupervised learning process, the unsupervised learning process not requiring user feedback to train the neural network machine learning model;
receiving, by the one or more processors, two text blocks for comparison, the comparison performed using the trained unsupervised machine learning model;
identifying, by the one or more processors, an unobserved token in at least one of the two text blocks, wherein the unobserved token does not appear in the text corpus used to train the unsupervised machine learning model; and
determining, by the one or more processors, a semantic similarity between the two text blocks based on the unobserved token that does not appear in the text corpus used to train the machine learning model, the semantic similarity and the unobserved token used to retrain the machine learning model to improve accuracy.

10. The computer program product of claim 9, wherein the unsupervised machine learning model comprises a word embedding model or a bag-of-words model.

11. The computer program product of claim 9, wherein the programming instructions further comprise instructions for:
determining, by the one or more processors, a cosine similarity score based on determining a semantic similarity between the two text blocks using the unsupervised machine learning model;
penalizing, by the one or more processors, the cosine similarity score based on the unobserved token, and
wherein determining a semantic similarity between the two text blocks based on the unobserved token is based on the penalizing.

12. The computer program product of claim 11, wherein penalizing the cosine similarity score is based on a skip error ratio term and the cosine similarity score.

13. The computer program product of claim 11, wherein penalizing the cosine similarity score is based on a skip error ratio term, the cosine similarity score, and an overlap term.

14. The computer program product of claim 9, wherein the programming instructions further comprise instructions for:
adjusting the semantic similarity, by the one or more processors, based on user feedback.

15. The computer program product of claim 13, wherein the programming instructions further comprise instructions for:
determining, by the one or more processors, a new semantic similarity between the two text blocks based on the penalizing.

16. A computer system for determining semantic similarity between two text blocks using an unsupervised machine learning model, comprising:
one or more processors; and
one or more tangible storage media storing programming instructions for execution by the one or more processors to perform a method, the programming instructions comprising instructions for:
accessing a text corpus, the text corpus stored in a database;
training a machine learning model with the text corpus using an unsupervised learning process, the unsupervised learning process not requiring user feedback to train the machine learning model;
receiving two text blocks for comparison, the comparison performed using the trained unsupervised machine learning model;
identifying an unobserved token in at least one of the two text blocks, wherein the unobserved token does not appear in the text corpus used to train the unsupervised machine learning model; and
determining a semantic similarity between the two text blocks based on the unobserved token that does not appear in the text corpus used to train the machine learning model, the semantic similarity and the unobserved token used to retrain the machine learning model to improve accuracy.

17. The computer system of claim 16, wherein the unsupervised machine learning model comprises a word embedding model or a bag-of-words model.

18. The computer system of claim 16, wherein the programming instructions further comprise instructions for:
   determining a cosine similarity score based on determining a semantic similarity between the two text blocks using the unsupervised machine learning model;
   penalizing the cosine similarity score based on the unobserved token; and
   wherein determining a semantic similarity between the two text blocks based on the unobserved token is based on the penalizing.

19. The computer system of claim 18, wherein penalizing the cosine similarity score is based on a skip error ratio term and the cosine similarity score.

\* \* \* \* \*